US010619789B1

(12) United States Patent
Copeland

(10) Patent No.: US 10,619,789 B1
(45) Date of Patent: Apr. 14, 2020

(54) HEIGHT-ADJUSTABLE STAND FOR A FLAT-SCREEN TELEVISION

(71) Applicant: Todd W Copeland, Athens, TX (US)

(72) Inventor: Todd W Copeland, Athens, TX (US)

( * ) Notice: Subject to any disclaimer, the term of this patent is extended or adjusted under 35 U.S.C. 154(b) by 0 days.

(21) Appl. No.: 15/709,656

(22) Filed: Sep. 20, 2017

Related U.S. Application Data

(60) Provisional application No. 62/401,417, filed on Sep. 29, 2016.

(51) Int. Cl.
| | | |
|---|---|---|
| *F16M 11/00* | (2006.01) | |
| *F16M 11/18* | (2006.01) | |
| *F16M 11/10* | (2006.01) | |
| *F16M 11/04* | (2006.01) | |

(52) U.S. Cl.
CPC .......... *F16M 11/18* (2013.01); *F16M 11/046* (2013.01); *F16M 11/048* (2013.01); *F16M 11/10* (2013.01)

(58) Field of Classification Search
CPC ............. Y10S 248/917; Y10S 248/919; Y10S 248/923; Y10S 248/92; Y10S 248/922
USPC ................. 248/917, 918, 919, 920, 921, 922
See application file for complete search history.

(56) References Cited

U.S. PATENT DOCUMENTS

| | | | | |
|---|---|---|---|---|
| 9,167,707 B1* | 10/2015 | Wang | ................... | H05K 5/0204 |
| 9,247,861 B2* | 2/2016 | Kan | ....................... | H04N 5/655 |
| 9,822,921 B2* | 11/2017 | Chen | ................... | F16M 11/041 |
| 9,848,756 B2* | 12/2017 | Kan | ................... | A61B 1/00048 |
| 2004/0011938 A1* | 1/2004 | Oddsen, Jr. | ............ | F16M 11/10 |
| | | | | 248/393 |
| 2004/0188574 A1* | 9/2004 | Weatherly | ............ | A47B 81/061 |
| | | | | 248/161 |
| 2007/0064380 A1* | 3/2007 | Shin | ..................... | F16M 11/105 |
| | | | | 361/679.07 |
| 2007/0217134 A1* | 9/2007 | Shin | ..................... | A61M 11/105 |
| | | | | 361/679.07 |
| 2012/0019990 A1* | 1/2012 | Segar | ..................... | F16M 11/08 |
| | | | | 361/679.01 |
| 2013/0331741 A1* | 12/2013 | Kuro | ................... | A61H 1/0274 |
| | | | | 601/24 |

* cited by examiner

*Primary Examiner* — Steven M Marsh

(74) *Attorney, Agent, or Firm* — Kenneth L Tolar

(57) ABSTRACT

A television stand includes an elongated, vertical support pole having a front surface, a rear surface, a curved top portion, a bottom end and a hollow interior. Within the hollow interior is a motorized drive belt that moves an external carriage that is adapted to fasten to an existing television or television stand. Accordingly, using a local control panel, a remote unit or a portable electronic device, a viewer can easily raise or lower the television to a desired height. Also, when the television is raised to the upper portion of the pole, the curvature tilts the television downwardly, toward the viewer.

7 Claims, 2 Drawing Sheets

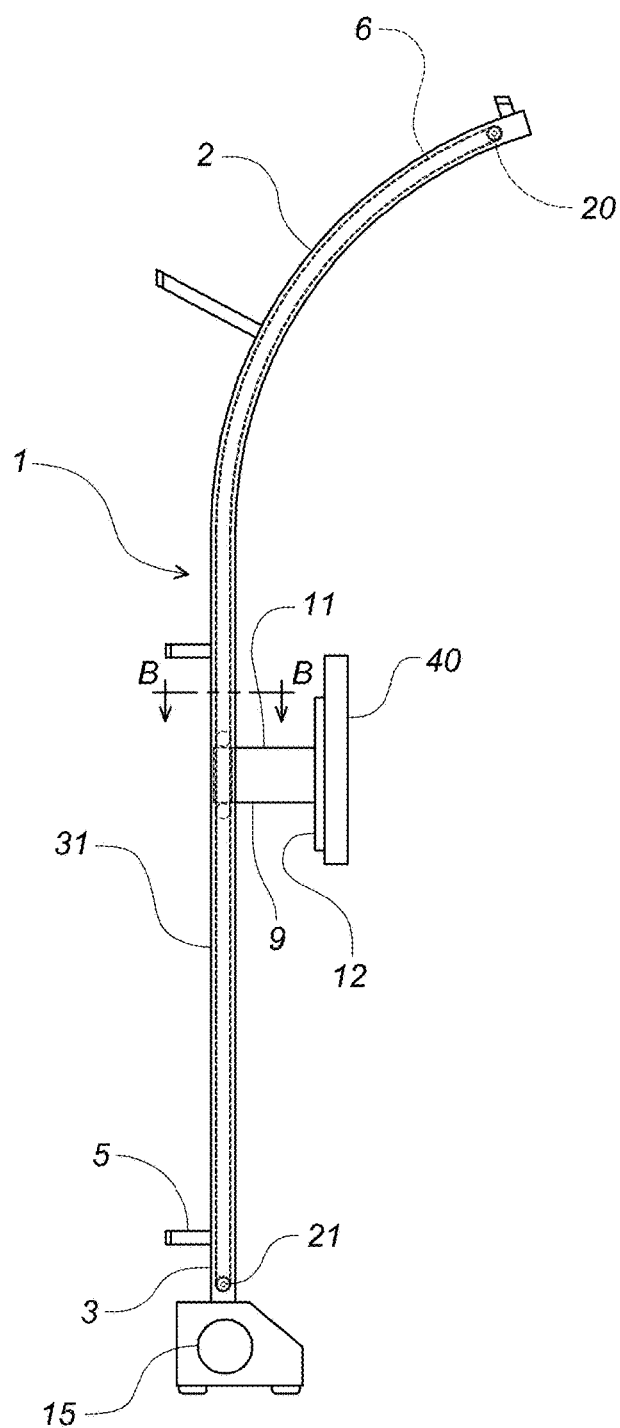 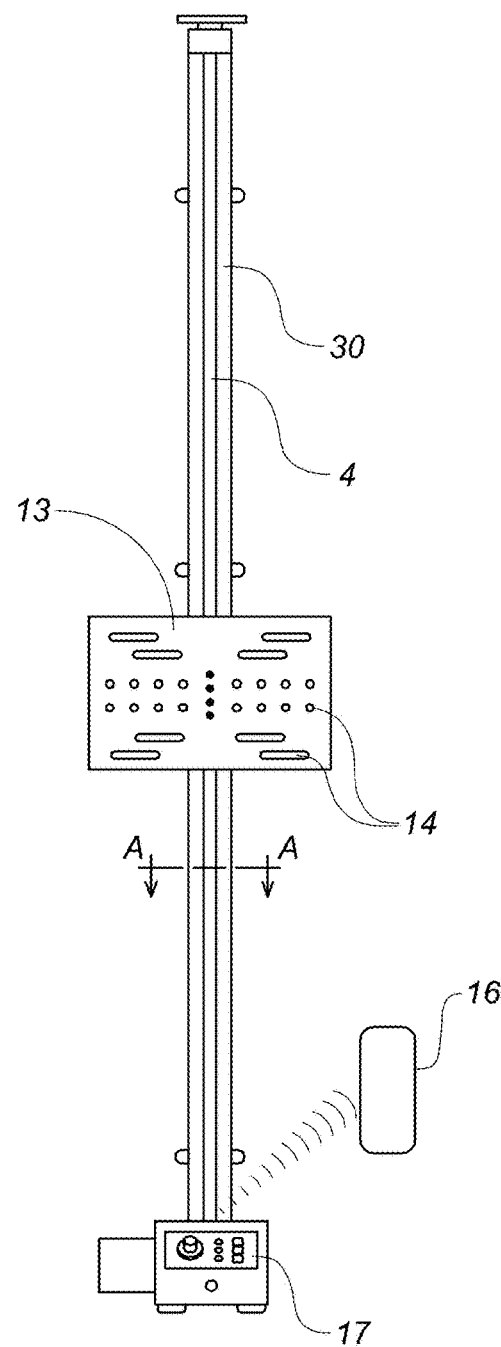
Fig. 1                  Fig. 2

HEIGHT-ADJUSTABLE STAND FOR A FLAT-SCREEN TELEVISION

CROSS REFERENCE TO RELATED APPLICATIONS

This application is entitled to the benefit of provisional patent application No. 62/401,417 filed on Sep. 29, 2016, the specification of which is incorporated herein by reference.

BACKGROUND OF THE INVENTION

The present invention relates to a unique stand that allows a user to easily adjust the height and angle of a large-screen television.

DESCRIPTION OF THE PRIOR ART

A larger or "flat-screen" television is typically supported on a stand that is placed on a table, entertainment center or other support surface. However, because the height of the support surface is fixed, the user can only swivel the TV to either side. Though some entertainment centers are equipped with adjustable platforms, they only allow the TV to be laterally rotated or perhaps vertically tilted within a limited range. And even though the screen angle may be acceptable, the television is often fixed at an undesirable height. The user must then raise or lower the support surface, if possible, which is laborious and inconvenient. Otherwise, the viewer must tolerate an unacceptable viewing position.

Accordingly, there is currently a need for a device that allows a user to easily adjust the height of a television. The present invention addresses this need by providing a stand including a vertical support pole having a motorized carriage for automatically raising and lowering an attached television to a desired height.

SUMMARY OF THE INVENTION

The present invention relates to a television stand comprising an elongated, vertical support pole having a front surface, a rear surface, a curved top portion, a bottom end and a hollow interior. Within the hollow interior is a motorized drive belt having a carriage attached thereto that is adapted to fasten to an existing television stand or directly to the rear surface of most existing televisions. Accordingly, using a local control panel, a remote unit or a portable electronic device, a viewer can easily raise or lower the television to a desired height. Also, as the television moves along the curved top portion of the pole, the curvature tilts the television downwardly, toward the viewer.

It is therefore an object of the present invention to provide a stand that allows a user to easily adjust the height of an attached television.

It is therefore another object of the present invention to provide a stand having a motorized television carriage that can be remotely controlled.

Other objects, features, and advantages of the present invention will become readily apparent from the following detailed description of the preferred embodiment when considered with the attached drawings and the appended claims.

BRIEF DESCRIPTION OF THE DRAWINGS

FIG. 1 is a side, plan view of the television stand according to the present invention, with a television attached thereto.

FIG. 2 is a front, plan view of the television stand with the television removed.

DESCRIPTION OF THE PREFERRED EMBODIMENT

Figure 3:
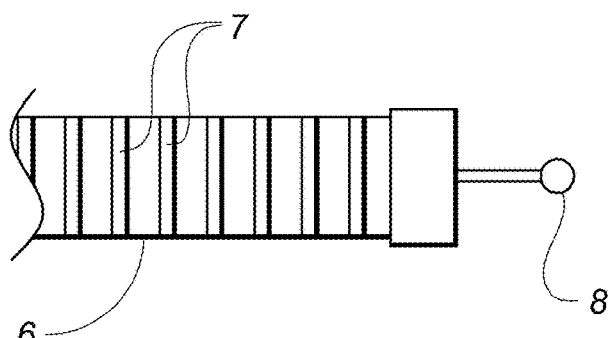
FIG. 3 is an isolated, sectional view of the drive belt.
Figure 4:
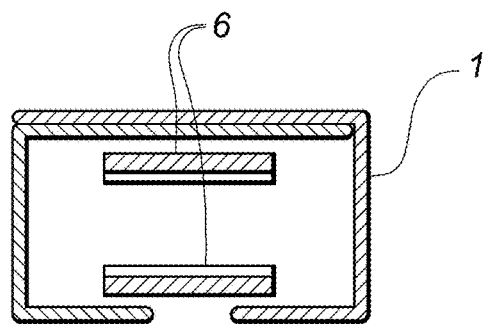
FIG. 4 is a sectional view of the support pole taken along A-A in FIG. 2.
Figure 5:
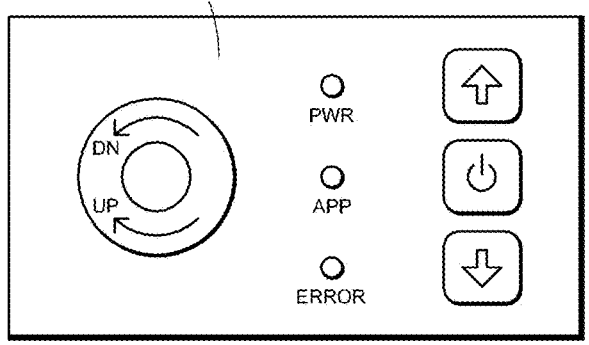
FIG. 5 is an isolated view of the control panel.
Figure 6:
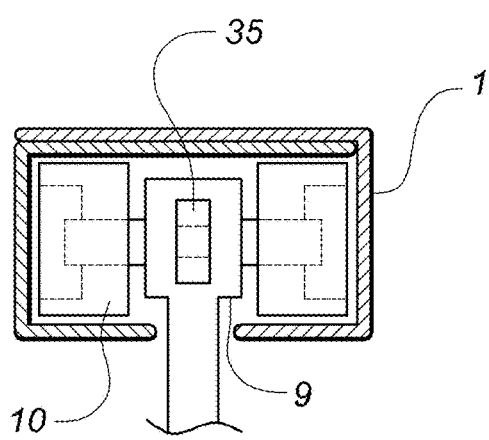
FIG. 6 is a sectional view of the support pole taken along B-B in FIG. 1 and depicting the carriage wheels and channel.

The present invention relates to a television stand comprising an elongated, vertical support pole 1 having a substantially C-shaped cross-sectional configuration. The support pole includes front surface 30, a rear surface 31, a curved top portion 2, a bottom end 3 and a hollow interior. A longitudinal slot 4 extending along the entire front surface is in communication with the hollow interior. On the rear surface are multiple brackets 5 with associated fasteners for anchoring the pole to wall studs.

Within the hollow interior is a drive belt 6 having a ribbed inner surface 7 that engages an idler sprocket 20 at the top end of the pole and a motorized sprocket 21 at the bottom end. Each end of the belt includes an eyelet 8 for fastening to a ring 35 on either the upper or lower side of a carriage block 9, described, infra.

The carriage block 9 includes a pair of opposing wheels 10 that ride on two opposing interior surfaces of the pole. Horizontally extending from the block is a brace member 11 that passes through the longitudinal slot on the front surface of the support pole. At a distal end of the brace member is a base plate 12 to which a universal adapter plate 13 is removably secured. The adapter plate includes various patterns and spacings of apertures and slots 14 for attaching directly to the rear surface of most existing televisions 40, or to swiveling television support stands to provide a greater range of adjustability.

The reversible motor 15 includes a micro-controller and wireless receiver in discrete communication with a remote unit 16 that allows a user to raise or lower the carriage. Alternatively, a smart phone, a tablet computer or other portable electronic device having a specifically configured software application can be used to remotely control the motor. A control panel 17 at the lower end of the pole allows the user to locally operate the motorized carriage, if desired. Both the upper and lower ends of the support pole include a mechanical stop to prevent the television from inadvertently colliding with a floor or ceiling.

Accordingly, using the local control panel, the remote unit or a smart phone, a viewer can easily raise or lower the television to a desired height. Also, as the television is lifted toward the upper portion of the pole, the curvature tilts the television downwardly, toward the viewer.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A television stand comprising:
   an elongated, vertical support pole having a front surface, a rear surface, a vertical lower portion and a curved top portion, a bottom end and a hollow interior;
   a carriage block movably mounted on the front surface of said vertical support pole, said carriage adapted to be fastened to a television;
   means for moving said carriage along the vertical lower portion and the curved top portion of said vertical support pole to selectively reposition said television at a desired height and angle.

2. The television stand according to claim 1 wherein said means for moving said carriage along the vertical lower portion and the curved top portion of said vertical support pole comprises:
   a drive belt within the hollow interior of said vertical support pole, said drive belt encompassing at least one sprocket and attached to said carriage block;
   a reversible motor driving said sprocket for moving said belt in either of two directions.

3. The television stand according to claim 2 wherein said means for moving said carriage along the vertical lower portion and the curved top portion of said vertical support pole further comprises a controller for operating said motor for a desired duration and in a desired direction.

4. The television stand according to claim 3 wherein said controller is selected from the group consisting of a local control panel on said vertical support pole, a remote unit and a portable electronic device.

5. The television stand according to claim 1 wherein said carriage block includes a pair of opposing wheels that ride within the hollow interior of said support pole to facilitate movement of said carriage along said support pole.

6. The television stand according to claim 1 wherein said carriage block includes an adapter plate having multiple patterns and spacings of apertures and slots to receive fasteners for attaching said adapter plate directly to either of a rear surface of the television and an existing television support stand.

7. The television stand according to claim 1 further comprising a means for anchoring said support pole to a wall stud.

* * * * *